(12) United States Patent
Bögelein et al.

(10) Patent No.: US 7,997,390 B2
(45) Date of Patent: Aug. 16, 2011

(54) AUTOMATIC SPRING-LOADED BRAKE FOR INDUSTRIAL TRUCK

(75) Inventors: Rolf Bögelein, Crailsheim (DE); Christoph Zeidler, Landshut (DE)

(73) Assignee: Jungheinrich Aktiengesellschaft (DE)

( * ) Notice: Subject to any disclaimer, the term of this patent is extended or adjusted under 35 U.S.C. 154(b) by 402 days.

(21) Appl. No.: 12/144,127

(22) Filed: Jun. 23, 2008

(65) Prior Publication Data

US 2008/0314701 A1    Dec. 25, 2008

(30) Foreign Application Priority Data

Jun. 21, 2007  (DE) .......................... 10 2007 028 688

(51) Int. Cl.
 *B60T 13/04* (2006.01)
(52) U.S. Cl. .......................................... 188/171; 310/77
(58) Field of Classification Search ........ 188/72.6–72.9, 188/156–162, 171, 173; 310/77
 See application file for complete search history.

(56) References Cited

U.S. PATENT DOCUMENTS

| | | | | |
|---|---|---|---|---|
| 5,796,192 A | * | 8/1998 | Riepl | 310/67 R |
| 6,125,975 A | * | 10/2000 | Seeto et al. | 188/171 |
| 6,142,266 A | * | 11/2000 | Appeldorn et al. | 188/171 |
| 6,161,659 A | * | 12/2000 | Maurice | 188/171 |
| 6,211,590 B1 | * | 4/2001 | Albrecht et al. | 310/77 |
| 6,412,608 B1 | * | 7/2002 | Mohr et al. | 188/72.9 |
| 6,505,714 B1 | * | 1/2003 | Ward | 188/72.1 |
| 6,543,587 B1 | | 4/2003 | Albrecht | |
| 7,341,127 B2 | * | 3/2008 | Gil et al. | 188/2 D |
| 7,434,669 B2 | * | 10/2008 | Halasy-Wimmer et al. | 188/171 |
| 2003/0051951 A1 | * | 3/2003 | Albrecht | 188/171 |
| 2006/0152078 A1 | | 7/2006 | Bald | |
| 2009/0099746 A1 | | 4/2009 | Hilberer | |
| 2009/0114461 A1 | * | 5/2009 | Clark et al. | 180/65.1 |

FOREIGN PATENT DOCUMENTS

| | | |
|---|---|---|
| DE | 19810593 | 6/1999 |
| DE | 19831541 | 3/2000 |
| DE | 10150803 | 5/2003 |
| DE | 10225038 | 12/2003 |
| DE | 102004046346 A | 3/2006 |
| DE | 102005005669 | 8/2006 |
| EP | 0905402 A | 2/1998 |
| EP | 1759950 | 3/2007 |

* cited by examiner

*Primary Examiner* — Christopher P Schwartz
(74) *Attorney, Agent, or Firm* — Kilpatrick Townsend Stockton LLP

(57) ABSTRACT

An industrial truck with at least one driven wheel, which is adapted to being braked during traveling operation by means of a service brake and which is adapted to being immobilized by a parking brake, comprises a braking force generation and braking force transmission apparatus, which is adapted to generating a braking force and to transmitting it to at least one wheel, preferably a driven wheel, the service brake being actuatable mechanically and/or pneumatically and/or hydraulically, wherein the parking brake is actuatable electromagnetically, and the industrial truck comprises a first armature disk, which is associated with the parking brake, has ferromagnetic material and is movable between an active position, in which it activates the braking force generation and braking force transmission apparatus for generating and transmitting a braking force to the at least one wheel, and an inactive position, in which it does not activate the braking force generation and braking force transmission apparatus.

16 Claims, 5 Drawing Sheets

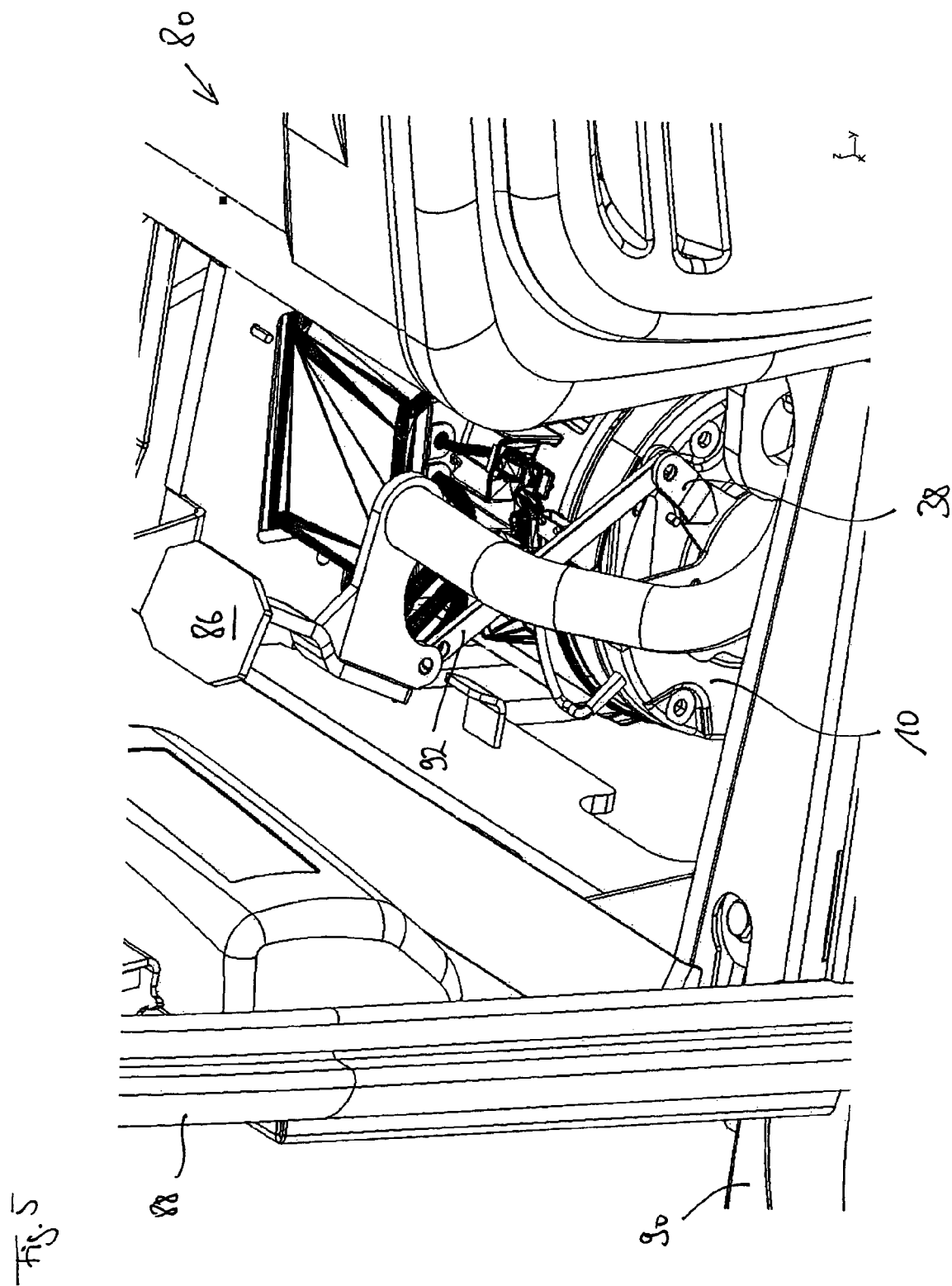

AUTOMATIC SPRING-LOADED BRAKE FOR INDUSTRIAL TRUCK

FIELD OF THE INVENTION

The present invention relates to an industrial truck with at least one driven wheel that can be during traveling operation by a service brake and what can be immobilized by a parking brake, the industrial truck comprising means for generating a braking force and transmitting it to at least one wheel, preferably a driven wheel, the service brake being actuatable mechanically and/or pneumatically and/or hydraulically. Such an industrial truck is known, for example, from EP 1 759 950 A1.

BACKGROUND OF THE INVENTION

Industrial trucks of the type mentioned at the outset are also in widespread use, however. In order to meet the conventional safety requirements for industrial trucks, they need to have both a service brake and a parking brake. In the mentioned document, an electrically actuated service brake can also be used as parking brake. Furthermore, if necessary a mechanical or hydraulic emergency brake system or emergency actuation system can be integrated in the brake system.

As regards further prior art, reference is made to the documents DE 102 59 878 A1, DE 101 50 803 B4, DE 10 2005 043 608 A1, DE 10 2005 005 669 A1, DE 198 31 541 A1, DE 198 10 593 A1 and DE 102 25 038 A1.

For safety reasons it is preferred to actuate different brake systems, such as the service brake system and the parking brake system, on the basis of different physical action principles in order to be able to make further use of at least the respective other system in the event of failure of one system. In this case, this is particularly advantageous if the parking brake is actuatable electrically since this considerably reduces the complexity involved on the industrial truck for installation and maintenance of the parking brake.

OBJECT OF THE INVENTION

It is therefore the object of the present invention to provide an industrial truck of the type mentioned at the outset which has a high degree of safety in terms of braking operation with at the same time a simple construction.

SUMMARY OF THE INVENTION

This object is achieved according to the invention by an industrial truck of the generic type, in which the parking brake is actuatable electrically. Therefore, the service brake can be provided as usual by a mechanical and/or pneumatic and/or hydraulic braking circuit with a high degree of operational reliability, with at the same time it being possible for the parking brake to be actuated electrically. This ability to actuate the parking brake electrically can be realized by piezoelectric actuators, at least one electric motor and the like. Particularly preferably, the ability to actuate the parking brake electrically is however realized by at least one electrically switchable electromagnet, since this can safely provide very high actuating forces whilst taking up a very small amount of physical space. In addition, it is also easily possible to realize comparatively large actuation paths of several millimeters using an electromagnet in contrast to, for example, piezoelectric actuators.

In accordance with the present invention, the design is such that the industrial truck comprises a first armature disc, which is associated with the parking brake, has ferromagnetic material and is movable between an active position, in which it activates the braking force generation and braking force transmission apparatus for generating and transmitting a braking force to the at least one wheel, and an inactive position, in which it does not activate the braking force generation and braking force transmission apparatus. The first armature disk can have only locally ferromagnetic material, preferably has predominantly ferromagnetic material and is particularly preferably manufactured substantially completely from ferromagnetic material.

A further advantage of the industrial truck according to the invention is the fact that the above-described braking function can be implemented in a single braking unit, which can be in the form of a dry-running braking unit. A braking unit equipped in this way can advantageously be flange-connected directly to the motor, for example in such a way that the motor is installed between two bearing plates, with a transmission being flange-connected to one bearing plate of the motor and the braking unit being flange-connected to the opposite bearing plate of the motor. Such dry-running brakes cause fewer losses, in particular do not cause any churning losses, with the result that they can be operated with a higher degree of efficiency. At the same time, the replacement of the oil, which is otherwise regularly necessary, can be dispensed with, with the result that the intervals for regular maintenance can be extended in comparison with wet-running brakes.

The "braking force generation and braking force transmission apparatus" can be any apparatus which is suitable for generating a braking force and transmitting it to a wheel. This may be a magnet arrangement of an eddy current brake, which, however, does not allow braking to a speed of zero, and is preferably at least one brake disc, which runs between friction linings and is connected in torque-transmitting fashion to the wheel. Likewise, a brake lamella stack known per se with fixed and rotatable brake lamellas which are arranged alternately in the axial direction can be used as the "braking force generation and braking force transmission apparatus".

A particularly space-saving and installation-friendly design of the braking unit provided in the industrial truck can be obtained by virtue of the fact that one and the same braking force generation and braking force transmission apparatus is associated with both the service brake and the parking brake in such a way that both an actuation of the service brake and an actuation of the parking brake activates the braking force generation and braking force transmission apparatus for generating and transmitting a braking force to the at least one wheel. As has already been explained above, it is preferable for reasons of operational reliability if the braking force generation and braking force transmission apparatus generates the braking force which is transmittable to a wheel in a force-fitting, in particular frictional manner. Such braking force generation and braking force transmission apparatuses have proven successful in a large number of applications and allow complete and rapid braking of the industrial truck to a standstill as well as the immobilizing of the industrial truck when it is at a standstill.

In order to ensure that the industrial truck is safely immobilized in the event of failure of the power supply, the invention can provide that the industrial truck comprises an immobilizing prestressing device, which exerts an immobilizing prestressing force on the first armature disk so as to prestress it toward the active position. In this case, an electrically actuatable actuator, in particular an energized electromagnet, can hold the first armature disk in the inactive position. When the energizing of the electrically actuatable actuator comes an end, the force effect thereof also comes to an end, with the result that the immobilizing prestressing force is no longer compensated for by the force of the actuator and thus can move the first armature disk into the active position.

The immobilizing prestressing device can comprise, in a case which is particularly simple in design terms and is therefore preferred, at least one compression spring, which exerts the abovementioned immobilizing prestressing force. In order to increase the immobilizing prestressing force, it is preferable to provide a plurality of compression springs. Force can be introduced in a particularly targeted manner using helical compression springs.

In order to be able to introduce the immobilizing prestressing force into the first armature disk as uniformly and symmetrically as possible and therefore to prevent the first armature disk from becoming stuck in an undesirable manner, it is furthermore preferred to arrange the plurality of compression springs equidistantly, in particular along a annular direction of the armature disc. In order to prevent the service brake function from being influenced by the preferred electromagnet mentioned previously, the invention can provide, in order to achieve a braking effect of the service brake, that it comprises a non-ferromagnetic second armature disc, which is associated with the service brake and which is displaceable between an engagement position, in which it activates the braking force generation and braking force transmission apparatus for generating and transmitting a braking force to the at least one wheel, and a disengaged position, in which it does not activate the braking force generation and braking force transmission apparatus. As a result of its non-ferromagnetic properties, the second armature disk can be displaced without a force originating from the electromagnet which is associated with the parking brake needing to be overcome during this displacement. As a result, a small actuating device which provides a comparatively low actuating force is sufficient for displacing the second armature disc.

The braking unit provided in the industrial truck manages with very little physical space when the first and the second armature disk are movable or displaceable along a common trajectory, are preferably arranged coaxially and are movable or displaceable along the common axis.

Since the service brake is generally actuated substantially more often than the parking brake, it is expedient to design and arrange elements of the service brake in such a way that the service brake is actuatable independently of the parking brake and in particular independently of movements of component parts associated with the parking brake. This can be achieved, for example, by virtue of the fact that the second armature disc, when viewed in the direction of the common movement trajectory, is arranged between the braking force generation and braking force transmission apparatus and the first armature disc. In addition, with such an arrangement the first armature disk can be arranged very close, that is without the second armature disk being interposed, to the electromagnet, which interacts with the first armature disc.

In contrast, the parking brake is generally actuated when the industrial truck is in any case at a standstill, with the result that co-actuation of individual component parts associated with the service brake does not interfere during actuation of the parking brake. An arrangement can therefore be provided in which the first armature disc, during its movement from the inactive position into the active position, displaces the second armature disk from the disengaged position toward the engagement position, preferably into the engagement position. As a result, in addition always the same brake component part (in this case the second armature disc) can interact with the braking force generation and braking force transmission apparatus, with the result that the braking unit advantageously comprises a small number of component parts which are subject to wear. In this case, during braking undesirable play and undesirable dead movements can be prevented by the second armature disk bearing against the first armature disk when the second armature disk is located in its disengaged position.

In order to ensure that no residual braking force acts on the industrial truck during normal traveling operation without any actuation of the brake, it can be provided that the industrial truck comprises a service prestressing device, which exerts a service prestressing force on the second armature disk which prestresses it toward the disengaged position. In the preferred case described above in which the first and second armature disks are movable along a common trajectory, the service prestressing device can be supported on the first armature disc. In this case, the service prestressing force acting on the second armature disk acts on the first armature disk as a supporting force in the direction toward its active position. As a result of this arrangement, when the parking brake is released, i.e. when the first armature disk is moved from the active position into the inactive position, the second armature disk can be displaced from the engagement position into the disengaged position in a very simple manner without an additional actuator. In a particularly simple and space-saving manner, the service prestressing device can comprise an wave washer.

It may furthermore be desirable to be able to disengage the braking unit manually in the case of its failure by intervention from the outside. For this purpose, the industrial truck may comprise an emergency override apparatus, with which at least the parking brake can be disengaged manually.

In a manner which is particularly reliable and simple in design terms, the emergency override apparatus can be in form-fitting engagement with the first armature disc. For example, the emergency override apparatus can comprise an actuator, which passes through and engages behind the first armature disk and by means of which the first armature disk is movable at least from the active position into the inactive position. The actuator can be actuatable by hand or by means of a tool. In general, the braking unit with the service brake and the parking brake, or at least a multitude of component parts associated therewith, is accommodated in a brake housing. In this case, it is particularly advantageous for reducing the complexity involved with actuation if the actuator is actuatable from outside the brake housing, in which at least the first armature disk is accommodated.

As has already been described above, the braking force generation and braking force transmission apparatus can comprise a brake backplate, which is fixed in position in relation to a brake housing accommodating the service brake and the parking brake, and at least one brake lamella which is movable relative thereto, preferably with a brake lining provided on the brake backplate and/or on the at least one brake lamella. In this case, a braking force of the service brake can be provided in a very simple manner by virtue of the fact that the second armature disk in its engagement position presses the at least one brake lamella against the fixed brake backplate.

In accordance with an advantageous development of the present invention, the braking effect which is or can be generated by the brake backplate, brake lamella and second armature disk can be further increased by virtue of the fact that, on its face pointing toward the brake lamella, the second armature disk is provided with a brake lining. The brake lining can be designed to have one or more parts. In accordance with a first possible embodiment of the present invention, the brake backplate can be provided on the brake housing. For this purpose, the brake backplate can either be formed integrally on a brake housing part or can be fixedly connected to a brake housing section as a separate component part. In accordance with a further alternative embodiment, the brake backplate can also be provided on a drive motor of the industrial truck. It is also true in this case that the brake backplate can be formed integrally on the drive motor, for example the motor housing or a motor housing section, or can be fixedly connected to the drive motor as a separate component part. When the drive motor has a steel housing, the brake backplate is particularly preferably formed integrally as a section of the drive motor, for example as a so-called bearing plate (non-drive-end bearing plate or B-bearing plate ("B-Lagerschild")).

In order to prevent damage from occurring in the braking device as a result of particularly vigorous actuation of the service brake, it can be provided that at least the braking torque which is applicable by the service brake is limited in terms of absolute value by means of overload protection means in order to prevent excessively high braking torques from being exerted.

The applicant reserves the right to claim quite generally separate protection for an Industrial truck with at least one driven wheel, which is adapted to being braked during traveling operation by means of a service brake and which is adapted to being immobilized by a parking brake, the industrial truck comprising a braking force generation and braking force transmission apparatus, which is adapted to generating a braking force and to transmitting it to at least one wheel, preferably a driven wheel, the service brake being actuatable mechanically and/or pneumatically and/or hydraulically, and the parking brake being actuatable electrically, in particular electromagnetically, characterized in that at least the braking torque which is applicable by the service brake is limited in terms of absolute value by means of overload protection means in order to prevent excessively high braking torques.

In this case, the industrial truck can have an actuating element for actuating the service brake, which actuating element is to be actuated by an industrial truck driver and by means of which an actuator element, which is coupled in force-transmitting fashion to the second armature disc, is adjustable from a non-actuating position toward an actuating position. In this case, particularly simple design measures can be used to achieve the overload protection of the service brake by virtue of the overload protection means comprising a spring, which is arranged in force-transmitting fashion between the actuator element and the second armature disc. In addition, it can be provided that the actuating element has a limited actuation range and/or the actuator element has a limited adjustment range, with the result that the maximum braking force which is achievable using the overload protection means can also be safely predetermined. The actuation range is in this case not just limited by the braking elements, such as the above-described brake lamella and the second armature disc, bearing against one another, but is predetermined and limited independently of the state of any wear parts which may be provided in the brake.

BRIEF DESCRIPTION OF THE DRAWING

The present invention will be explained in more detail below with reference to an exemplary embodiment. In the drawing:

FIG. 5 is a further detail view of the industrial truck shown in FIGS. 3 and 4, with the brake pedal, which is coupled to the braking device in FIG. 1, being shown.

SPECIFIC DESCRIPTION

Figure 3:
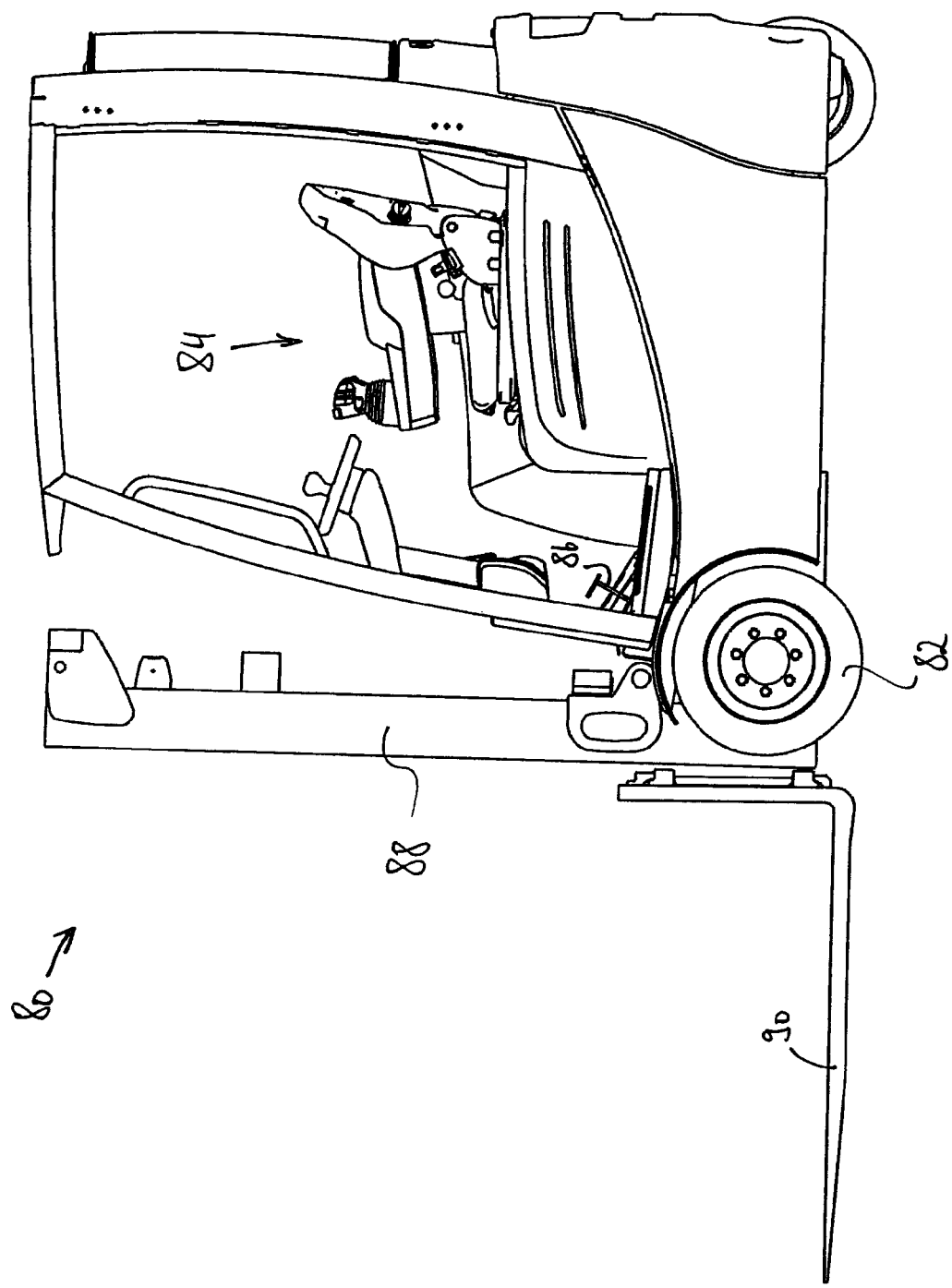
FIG. 3 is a side view of an industrial truck according to the invention.

In FIG. 3, an industrial truck in the form of a forklift truck as a whole is shown at 80. Moreover, FIG. 3 shows a driven wheel 82 that can be braked from the driver's seat 84 by means of a foot pedal 86. Moreover, FIG. 3 shows the lifting mast 88 on which a fork 90 is provided in such a way that it is vertically adjustable.

Figure 4:
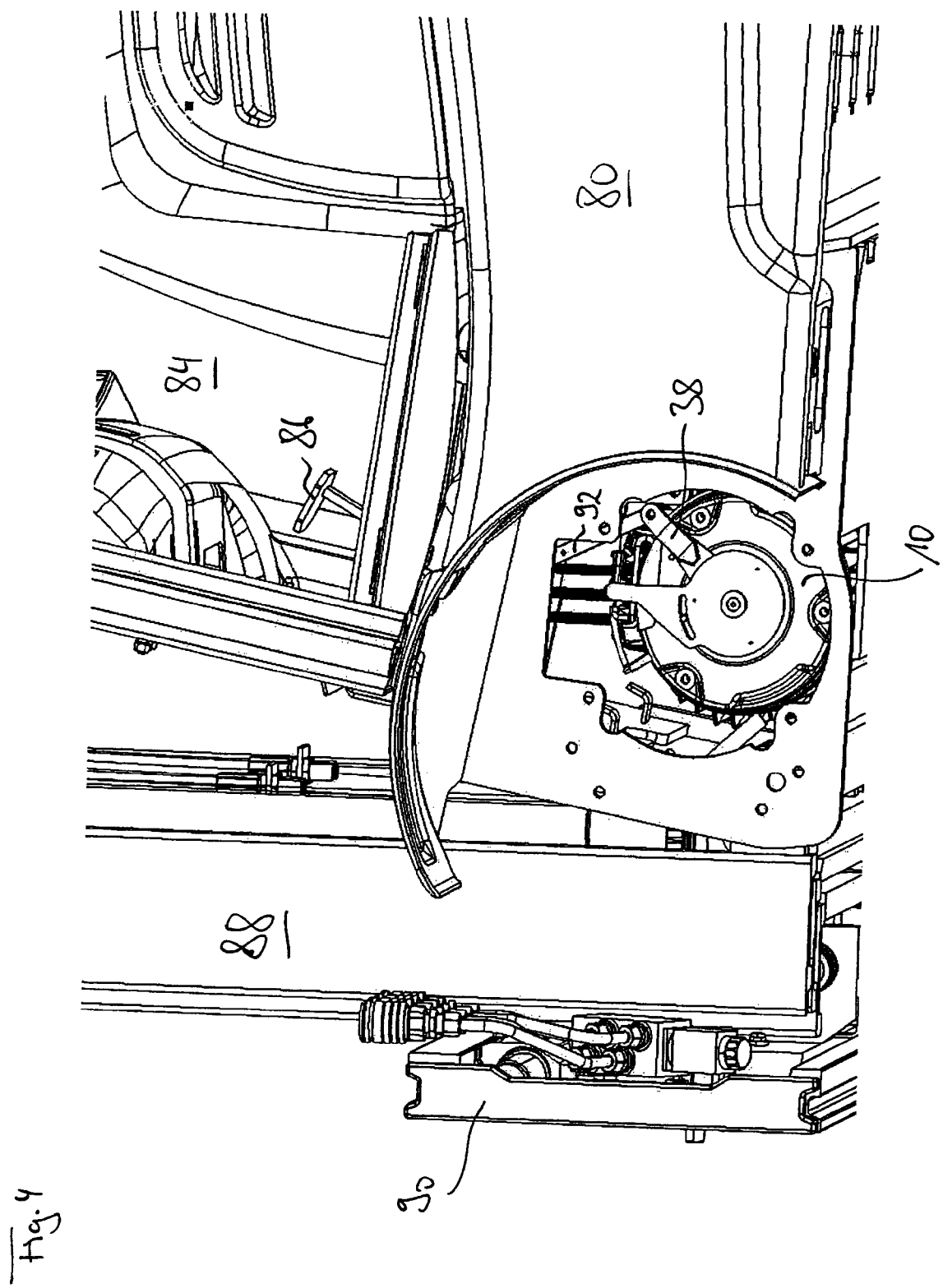
FIG. 4 is a detail view of the industrial truck from FIG. 3 with the braking device shown in FIG. 1.

FIG. 4 illustrates the forklift truck 80 with the wheel 82 and the braking unit associated therewith having been removed, so as to expose the braking unit 10, which is described in more detail further below and is connected to the front wheel that is opposite the wheel 82 of the forklift truck 80 and whose actuating lever 38, as is also illustrated in FIG. 5, is connected to the foot pedal 86 via a rod assembly 92 for actuating the braking unit 10.

The actuating lever 38, as a common central actuating lever, actuates both the braking unit 10 and the braking unit (not illustrated) of the wheel 82.

Figure 1:
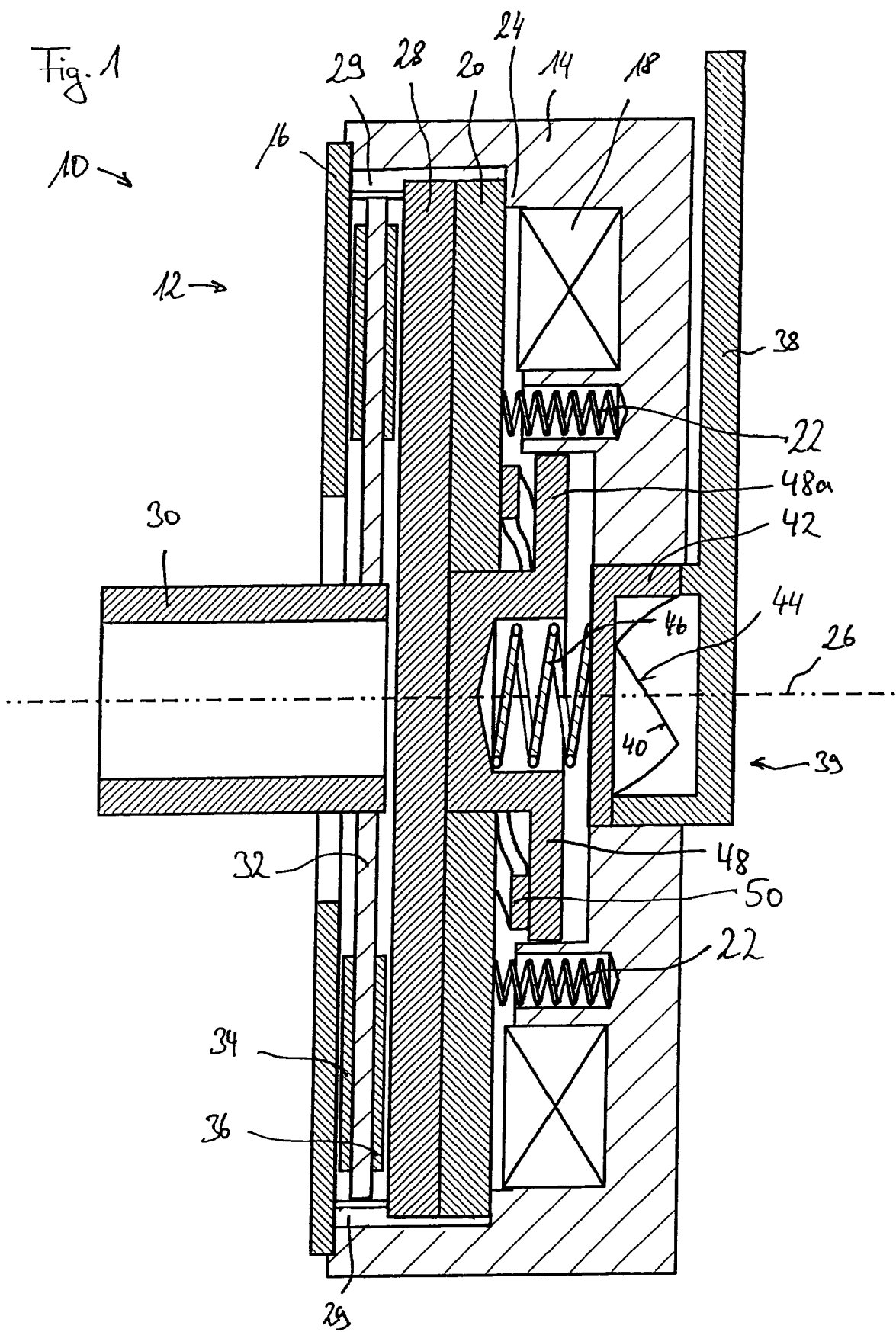
FIG. 1 is a schematic longitudinal sectional view of a braking device, showing the way in which it can be installed in an industrial truck according to the invention.

In FIG. 1, a braking unit for an industrial truck overall is given the designation 10. The braking unit 10 of an industrial truck (not illustrated in FIGS. 1 and 2) comprises a brake housing 12 with a housing body 14 and a pressure plate 16 fitted thereto.

Accommodated in the brake housing 12 is an electromagnet 18 that when energized attracts a first ferromagnetic armature disk 20, against the effect of immobilizing prestressing springs 22 and toward an annular projection 24 of the housing body 14.

In FIG. 1, the first armature disk 20 is illustrated in its inactive position, i.e. the armature disk 20 bears against the annular projection 24 and the electromagnet 18 is energized.

The immobilizing prestressing springs 22 are helical compression springs arranged at the same angular spacing from one another around the central axis 26 of the braking device 10. As a result, a symmetrical prestressing force can be exerted on the first armature disk 20 to prestress the first armature disk 20 toward the pressure plate 16.

A second non-ferromagnetic armature disk 28 bears against that end face of the first armature disk 20 directed toward the pressure plate 16. While the first armature disk 20 is associated with the parking brake or a parking brake function, the second armature disk 28 is associated with the service brake or a service-brake function.

The first and the second armature disks 20 and 28 are both movable along the central axis 26 of the braking unit 10. FIG. 1 shows the second armature disk 28 in a disengaged position. Both armature disks are guided on radial projections 29 with respect to their axial movement. The radial projections 29 are integrally formed on the housing body 14 and engage in guide grooves (not illustrated in FIG. 1) of the armature disks 20 and 28.

Arranged in the axial direction between the pressure plate 16 and the second armature disk 28 is a brake disk 32 connected to a hub 30 for joint rotation therewith but movable axially relative thereto and carrying on its opposite end faces annular brake linings 34 and 36 that are directed in opposite directions. The hub 30 is connected in torque-transmitting fashion to a driven wheel (not illustrated) of the industrial truck, possibly with a transmission interposed.

An actuating lever 38 is accommodated in the housing body 14 in such a way that it is rotatable about the central axis 26 but is axially immovable. The actuating lever 38 has a cylindrical engagement section with a serrated end-face formation 40 at its end 39 that projects into the brake housing 12. In more precise terms, the shape of the formation 40 in one plane is a zigzag line with three peaks and three troughs. The peaks and the troughs are spaced at approximately 120° from one another. A peak is angularly offset from the closest trough by approximately 60°. When viewed in developed form, directly adjacent peaks and troughs in the example shown in FIG. 1 are connected by planar faces.

The end 39 of the actuating lever 38 interacts with a first actuator part 42 mounted in the housing body 14 in such a way that it is axially displaceable, but fixed against rotation. The first actuator part 42 has an opposing formation 44 complementary to the formation 40 of the end 39. Rotation of the actuating lever 38 about the axis 26 causes relative movement of the formations 40 and 44 against one another, as a result of which, starting from the position shown in FIG. 1, the first actuator part 42 is moved in the axial direction toward the armature disks 20 and 28.

As a result, an initially untensioned overload spring 46, which is supported at one end on the first actuator part 42 and at the other end on a second actuator part 48, is compressed, with the result that the overload spring 46, with increasing axial displacement of the first actuator part 42, exerts an increasing axial compressive force on the second actuator part 48.

The second actuator part 48 is fixed to the second armature disk 28 for joint axial movement therewith. A wave washer 50 is provided between an annular collar 48a of the part 48 and a radially inner section of the first armature disk 20, which washer 50 prestresses the annular collar 48a and the disk 48 away from the first armature disk 20 and therefore prestresses the second armature disk 28 toward the first armature disk 20. When the compressive force exerted by the overload spring 46 on the second actuator part 48 as a result of the displacement of the first actuator part 42 exceeds the prestressing force exerted in the opposite direction by the wave washer on the second actuator part 48, the second actuator part 48, which is mounted in the brake housing 12 in such a way that it is fixed against rotation, but axially movable, begins to move gradually in the direction of the compressive force, i.e. toward the brake disk 32. As a result, the second armature disk 28 comes to bear against the brake lining 36 and displaces the brake disk 32 in the axial direction until the brake lining 34 bears against the pressure plate 16. The brake disk 32 with its brake linings 34 and 36 is therefore clamped between the pressure plate 16 and the second armature disk 28 depending on the extent of the actuation of the actuating lever 38, it being possible for the frictional force (braking force) occurring at the brake linings 34 and 36 to be varied by actuation of the actuating lever 38.

The overload spring 46 and the engagement formations 40 and 44 in this case ensure that the maximum achievable braking force is limited. This is determined by the maximum axial displaceability of the first actuator part 42 which can be achieved as a result of the formations 40 and 44 and by the stiffness of the overload spring 46.

If a complete immobilization of the industrial truck is desired, the electromagnet 18 is switched off by a corresponding actuation by the industrial truck driver, with the result that its force effect on the first armature disk 20 comes to an end.

As a result, the force compensating for the prestressing force of the immobilizing prestressing springs 22 is dispensed with, with the result that the immobilizing prestressing springs 22 move the first armature disk 20 and with it the second armature disk 28 toward the left in FIG. 1 until, in turn, the brake disk 32 with the brake linings 34 and 36 provided on it is clamped in between the pressure plate 16 and the second armature disk 28 while exerting a predetermined immobilizing force.

The parking brake or parking-brake function is released by renewed energization of the electromagnet 18, whose attraction force on the first armature disk 20 is greater than the force exerted by the immobilizing prestressing springs 22. As a result of the provision of the wave washer 50 between the second actuator part 48 and the first armature disk 20, the attraction of the first armature disk 20 by the electromagnet 18 toward the annular projection 24 also results in a movement of the second armature disk 28 away from the brake disk 32 and toward the electromagnet 18, with the result that the action of the parking brake can be completely cancelled.

The process of releasing the service brake takes place simply by ending actuation of the actuating lever 38. The wave washer 50, which is compressed during actuation of the service brake, resets the second armature disk 28 via the second actuator part 48 into the disengaged position shown in FIG. 1 once actuation of the actuating lever 38 has come to an end, with the actuator part 42 also returning to the position shown in FIG. 1 as a result of the overload spring 46 that is compressed in the is actuated position. The actuating lever 38 is normally prestressed into the position shown in FIG. 1.

It is readily comprehensible to a person skilled in the art that the immobilizing prestressing springs 22 need to be designed in terms of their spring stiffness so as to match the desired immobilizing force and the immobilizing travel provided. Then, the electromagnet 18 needs to be dimensioned based on the spring stiffness of the immobilizing prestressing springs 22 and their number.

In addition, the spring stiffnesses of the overload spring 46, on the one hand, and the wave washer 50, on the other hand, need to be matched to one another taking into consideration the deformation in each case associated with these springs. In the example shown in FIG. 1, the spring stiffness of the overload spring 46 should be selected so as to be markedly higher than that of the wave washer 50.

Figure 2:
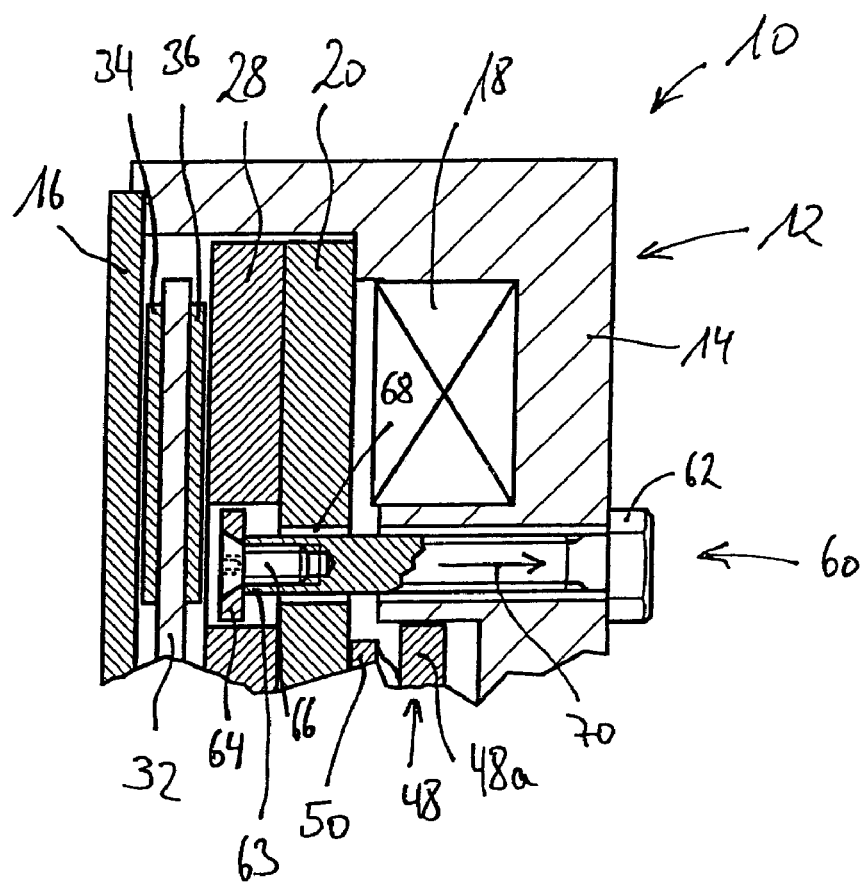
FIG. 2 is a detail view of an emergency override apparatus of the braking device shown in FIG. 1.

FIG. 2 illustrates a detail view of an emergency override apparatus of the braking unit shown in FIG. 1. FIG. 2 shows the radially outer region of a longitudinal section through the central axis 26 of the braking unit 10, like the longitudinal section in FIG. 1. The section plane in FIG. 2 is rotated by an angle about the central axis 26 with respect to the section plane in FIG. 1, however. FIG. 2 illustrates an emergency override apparatus approximately on the radial position of the immobilizing prestressing springs 22 in FIG. 1, which emergency override apparatus is overall given the designation 60. This is emergency override apparatus 60 comprises a first screw 62 that passes through the housing body 14 and the first armature disk 20.

At its longitudinal end 63 remote from the screw head, a securing plate 64 is held by a retaining screw 66 on the longitudinal end 63 of the screw 62. The retaining screw 66 and the screw 62 are coaxial, i.e. the retaining screw 66 is screwed coaxially into the shaft of the screw 62.

As a result of the countersunk head provided on the retaining screw 66, the securing plate 64 is connected to the longitudinal end 63 of the screw 62 without any play. The dimension of the securing plate 64 in the radial direction in relation to the central axis 26 of the braking unit 10 is selected in such a way that a hole 68 of the first armature disk 20 through which the screw 62 passes accommodates the screw 62 provided with the securing plate 64, engaging behind it, i.e. the diametral dimension of the securing plate 64 is greater than the diameter of the hole 68.

FIG. 2 shows the first armature disk 20 in its inactive position, with it at an axial spacing from the securing plate 64, which spacing is greater than the axial travel of the first armature disk 20 from the inactive position into the active position, with the result that the emergency override apparatus 60 is not influenced by the movement of the first armature disk 20 which is conventional during operation.

Provision can moreover be made for the emergency is override apparatus 60 to be prestressed into the position shown in FIG. 2, for example by means of a spring (not illustrated) which is provided between the securing plate 64 and the first armature disk 20. This spring can surround the shaft of the screw 62 in the region of the longitudinal end 63 as a helical compression spring. The screw 62 and in particular its screw head represent an actuator for the emergency override apparatus 60 within the meaning of the present application.

As a result of the movement of the screw 62 in the direction of the arrow 70, a first armature disk 20, which is located in an undesirable manner in the active position, can be moved into the inactive position from outside the brake housing 12. Such a movement of the screw 62 advantageously takes place using a tool, for example a forked wedge, which is driven between the screw head of the screw 62 and the outer face of the housing body 14, which acts as the bearing face therefor. The parking brake function of the braking unit 10 can therefore be cancelled in the event of an unwanted power failure.

As an alternative to the illustrated embodiment of the emergency override apparatus, it can also be designed as follows: if the available physical space permits it, the first armature disk 20 can be designed in such a way that it projects radially beyond the second armature disk 28 in at least one annular section, preferably in a plurality of annular sections, possibly along its entire circumference. An eccentric lever, which is pivotable about an eccentric axis of rotation, which is preferably orthogonal to the central axis 26 and parallel to the plane of the first armature disk 20, can be juxtaposed in the axial direction with that end face of the first armature disk 20 that is directed away from the electromagnet 18. The eccentric lever can be rotatably actuated from the outside by an eccentric shaft. As a result of this rotary actuation, the eccentric lever finally comes to bear against that face of the first armature disk 20 that is directed away from the electromagnet, with the result that, as the torque acting on the eccentric shaft increases, an axial force acting is applied to the first armature disk 20 and acts against the prestressing force of the immobilizing prestressing springs 22, with the result that the first armature disk 20 can be moved into its inactive position or at least out of its active position by means of the eccentric lever being rotated.

In order to prevent the first armature disk 20 from becoming stuck during emergency disengagement, advantageously a plurality of eccentric levers can be arranged distributed around the circumference of the first armature disk 20, preferably axially (in relation to the central axis 26) opposite one another in pairs. If an uneven number of eccentric levers is provided, they should be offset at the same angular spacing from one another along the circumference of the first armature disk 20 so as to prevent the first armature disk 20 from becoming stuck during the emergency disengagement.

Preferably, the at least one eccentric lever is fixable, so that, when the first armature disk 20 has been moved out of its active position by the at least one eccentric lever, this first armature disk 20 can be held in the position reached by the described emergency disengagement actuation as a result of the one eccentric lever being fixed and the eccentric levers can be released.

The invention claimed is:

1. In an industrial truck having a wheel, a service brake, and an emergency brake, a brake assembly comprising:
    a brake housing fixed on the truck adjacent the wheel;
    a wheel-brake disk rotatable in the housing about an axis, rotationally coupled to the wheel, and shiftable between a braking position bearing on the housing and a nonbraking position substantially out of engagement with the housing;
    a nonferromagnetic service-brake disk rotatable in the housing axially adjacent the wheel-brake disk and shiftable between an active position bearing axially on the wheel-brake disk and pressing same into the respective braking position and an inactive position substantially out of engagement with the wheel-brake disk;
    service-brake actuating means for shifting the service-brake disk between the respective engaged and inactive positions;
    a magnetically attractable emergency-brake disk rotatable in the housing axially adjacent the service-brake disk and shiftable axially between an active position bearing axially on the service-brake disk and pressing same against the wheel-brake disk and thereby pressing the wheel-brake disk against the housing and an inactive position substantially out of engagement with the wheel-brake disk; and
    an electromagnet in the housing energizable to shift the emergency-brake disk into the respective inactive position.

2. The industrial-truck brake assembly defined in claim 1, further comprising:
    first spring means engaged between the emergency-brake disk and the housing for urging the emergency-brake disk into the respective active position.

3. The industrial-truck brake assembly defined in claim 2, further comprising:
    second spring means braced between the service-brake disk and the emergency-brake disk and urging the service-brake disk into the inactive position, whereby when the emergency-brake disk is in the respective inactive position the second spring means pulls the service-brake disk into the respective inactive position.

4. The industrial-truck brake assembly defined in claim 3 wherein the second spring means is a wave spring.

5. The industrial truck according to claim 1 wherein at least a braking torque which is applicable by the service brake is limited in terms of absolute value by means of overload protection means in order to prevent excessively high braking torques.

6. The industrial truck according to claim 5, further comprising
    an actuating element actuatable by an industrial truck driver and by means of which an actuator element coupled in force-transmitting fashion to the service-brake disk is shiftable from a non-actuating position towards an actuating position.

7. The industrial truck according to claim 6 wherein the overload protection means comprises a spring in force-transmitting fashion between the actuator element and the service-brake disk.

8. The industrial truck according to claim 1, further comprising an immobilizing prestressing device that exerts an immobilizing prestressing force on the emergency-brake disk which immobilizing prestressing force prestresses the emergency-brake disk towards the respective active position.

9. The industrial truck according to claim 8 wherein the electromagnet when energized holds the emergency-brake disk against the immobilizing prestressing force of the immobilizing prestressing device in the respective inactive position.

10. The industrial truck according to claim 1 wherein the emergency-brake and the service-brake disks are movable or displaceable along a common trajectory coaxially and are movable or displaceable along a common axis.

11. The industrial truck according to claim 10 wherein the service-brake disk is arranged between the wheel-brake disk and the emergency-brake disk.

12. The industrial truck according to claim 1, further comprising
an emergency override apparatus adapted to manually disengaging at least the parking brake.

13. The industrial truck according to claim 12 wherein the emergency override apparatus comprises an actuator passing through and engaging behind the emergency-brake disk and by means of which the emergency-brake disk is movable from outside the brake housing in which at least the emergency-brake disk is accommodated at least from the active position into the inactive position.

14. The industrial truck according to claim 1 wherein the emergency-brake disk, on movement from the respective inactive position into the respective active position, displaces the service-brake disk from the respective inactive position to the respective active position.

15. The industrial truck according to claim 1, further comprising
a service prestressing device that exerts a service prestressing force on the service-brake disk and thereby prestresses the service-brake disk against the emergency-brake disk, with the result that the service prestressing force acting on the service-brake disk acts on the emergency-brake disk in the direction towards its active position.

16. In an industrial truck having a wheel, a brake comprising:
a brake housing fixed on the truck adjacent the wheel;
a wheel-brake disk rotatable in the housing about an axis, rotationally coupled to the wheel, and shiftable between a braking position bearing on the housing and a nonbraking position substantially out of engagement with the housing;
a service-brake disk rotatable in the housing axially adjacent the wheel-brake disk and shiftable between an active position bearing axially on the wheel-brake disk and pressing same into the respective braking position and an inactive position substantially out of engagement with the wheel-brake disk;
service-brake actuating means for shifting the service-brake disk between the respective engaged and inactive positions;
a magnetically attractable emergency-brake disk rotatable in the housing axially adjacent the service-brake disk and shiftable axially between an active position bearing axially on the service-brake disk and pressing same against the wheel-brake disk and thereby pressing the wheel-brake disk against the housing and an inactive position substantially out of engagement with the wheel-brake disk;
an electromagnet in the housing energizable to shift the emergency-brake disk into the respective inactive position;
first spring means engaged between the emergency-brake disk and the housing for urging the emergency-brake disk into the respective active position; and
second spring means braced between the service-brake disk and the emergency-brake disk and urging the service-brake disk into the inactive position, whereby when the emergency-brake disk is in the respective inactive position the second spring means pulls the service-brake disk into the respective inactive position.

\* \* \* \* \*